US012599527B2

(12) United States Patent
Zhao et al.

(10) Patent No.: US 12,599,527 B2
(45) Date of Patent: Apr. 14, 2026

(54) INTELLIGENT SURGICAL DISSECTION TABLE CAPABLE OF EXCHANGING POSITIONS

(71) Applicant: AFFILIATED HOSPITAL OF JIANGNAN UNIVERSITY, Wuxi (CN)

(72) Inventors: Peng Zhao, Wuxi (CN); Zhengguo Wu, Wuxi (CN); Dong Guo, Wuxi (CN); Zhewu Jin, Wuxi (CN); Yunjuan Nie, Wuxi (CN)

(73) Assignee: AFFILIATED HOSPITAL OF JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 19/256,201

(22) Filed: Jul. 1, 2025

(65) Prior Publication Data

US 2026/0014041 A1 Jan. 15, 2026

Related U.S. Application Data

(63) Continuation of application No. PCT/CN2024/122174, filed on Sep. 29, 2024.

(30) Foreign Application Priority Data

Oct. 16, 2023 (CN) ........................ 202311343775.4

(51) Int. Cl.
*A61G 13/06* (2006.01)
*A61G 13/10* (2006.01)

(52) U.S. Cl.
CPC ............ *A61G 13/06* (2013.01); *A61G 13/10* (2013.01)

(58) Field of Classification Search
CPC ................ A61G 13/00; A61G 13/0018; A61G 13/0027; A61G 13/0036; A61G 13/02;
(Continued)

(56) References Cited

U.S. PATENT DOCUMENTS 2,258,782 A * 10/1941 McKean ............ A61G 13/0018
312/22
2,829,780 A * 4/1958 Boor ...................... G09F 11/18
211/121

(Continued)

FOREIGN PATENT DOCUMENTS

CN 108272579 A 7/2018
CN 211356483 U 8/2020

(Continued)

*Primary Examiner* — George Sun
(74) *Attorney, Agent, or Firm* — IPRO, PLLC; Na Xu

(57) ABSTRACT

Provided is an intelligent surgical dissection table capable of exchanging positions, and belongs to the technical field of medical dissection. The intelligent surgical dissection table includes a control module, a power module and two box-type dissection tables, the control module includes a controller and an electric motor, the power module includes a rotating shaft, a rotating frame and hydraulic cylinders, and two sides of each of the box-type dissection tables are both connected with box shafts; and the electric motor is connected to and controls the rotating shaft, the box shafts are matched with guide rails through bearings, and driving devices with a self-locking function are also mounted on the box shafts. According to the present disclosure, the switching of two experimental subjects can be achieved. Moreover, a limitation of the height of an operator is solved, the manual operation cost is reduced, and the efficiency is further improved.

9 Claims, 4 Drawing Sheets

(58) Field of Classification Search
CPC ........ A61G 13/04; A61G 13/06; A61G 13/08; A61G 13/10
See application file for complete search history.

(56) References Cited

U.S. PATENT DOCUMENTS

| | | | | | |
|---|---|---|---|---|---|
| 3,167,789 | A * | 2/1965 | Wicks | A61G 7/1046<br>5/81.1 HS | |
| 3,608,887 | A * | 9/1971 | Rose | A61G 13/0027<br>27/28 | |
| 5,248,049 | A * | 9/1993 | Murphy, Sr. | B25H 3/06<br>211/164 | |
| 5,924,580 | A * | 7/1999 | Chase | A61G 13/0027<br>211/1.55 | |
| 11,266,256 | B2 * | 3/2022 | Tovey | A47B 63/065 | |
| 2007/0033735 | A1 * | 2/2007 | Formenti | A61B 6/502<br>5/600 | |
| 2008/0289636 | A1 * | 11/2008 | Lacroix | A61G 13/0045<br>128/845 | |
| 2014/0058286 | A1 * | 2/2014 | DeFreitas | A61B 5/708<br>128/845 | |
| 2017/0151115 | A1 * | 6/2017 | Jackson | A61B 6/0407 | |
| 2020/0085661 | A1 * | 3/2020 | McClain | A61G 13/0027 | |
| 2020/0121534 | A1 * | 4/2020 | McClain | A61G 13/04 | |

FOREIGN PATENT DOCUMENTS

| | | | |
|---|---|---|---|
| CN | 112618189 | A | 4/2021 |
| CN | 213431306 | U | 6/2021 |
| CN | 115300296 | A | 11/2022 |
| CN | 117462360 | A | 1/2024 |

* cited by examiner

INTELLIGENT SURGICAL DISSECTION TABLE CAPABLE OF EXCHANGING POSITIONS

TECHNICAL FIELD

The present disclosure relates to an intelligent surgical dissection table capable of exchanging positions, and belongs to the technical field of medical surgical dissection.

BACKGROUND

During dissection operation of corpses used for medical education or training, a traditional disc-type dissection table is generally adopted, which is structurally a fixed single-layer disc table that can only carry one corpse, cannot be adjusted in height when surgical dissection operation is performed, and is difficult to clean and prone to damage, thereby bringing great inconvenience to an operator. Moreover, an experimental space cannot be effectively utilized, thereby causing waste of energy (electricity, ventilation, etc.) and bringing many troubles to teaching arrangement.

For example, a dissection table with an exhaust mechanism is disclosed by CN2549908Y. Although the exhaust mechanism is provided, the exhaust mechanism is provided at a bottom, so that an exhaust effect is limited. Moreover, the problem of residual stains on a surface of the dissection table cannot be solved, thereby inevitably leading to a poor cleaning effect and requiring additional manual cleaning of the surface of the dissection table to prevent contamination of a next experimental subject. Meanwhile, although the solution is provided with a pulley block for ascending and descending, when it is necessary to dissect two experimental subjects continuously, it is quite troublesome to transfer the original experimental subject and replace the original experimental subject with the new experimental subject, leading to a defect in transfer. The defect also exists in CN205251749U and CN113397755A. The switching and transfer of the experimental subjects after dissection are not facilitated by only using single transport equipment.

Meanwhile, during the transfer, these devices all require manual cleaning of the table surface, thereby affecting working efficiency and bringing great inconvenience to the operator. Moreover, the experimental subjects may also be contaminated by an external environment or human contact during the transfer or the manual cleaning.

SUMMARY

To solve the above problems, the present disclosure provides an intelligent surgical dissection table capable of exchanging positions, which includes a control module, a power module and two box-type dissection tables, where the control module includes a controller and an electric motor, the power module includes a rotating shaft, a rotating frame and hydraulic cylinders, two sides of each of the box-type dissection tables are both connected with box shafts, and the box shafts may be any shaft members connected to boxes.

The electric motor is connected to and controls the rotating shaft, the rotating shaft is connected to the rotating frame through cross rods, the rotating frame is square and is provided with guide rails, and the box shafts are matched with the guide rails through bearings.

It should be understood that the box-type dissection tables are boxes used for placing experimental subjects, the experimental subjects may be complete human corpses and may also be incomplete corpse pieces, for example, corpses or corpse pieces fished out from a formalin pool. The experimental subjects need to be placed horizontally on the box-type dissection tables. Taking the human corpses as an example, the human corpses may be placed on the dissection tables in positions, such as lying flat, lying on one side and lying down, similar to human bodies, and bottoms of the boxes should face the ground and stay in a horizontal state.

The “horizontal” refers to a state in any plane parallel to the horizon line relative to the ground, and “vertical” refers to a state in any plane perpendicular to the horizon line relative to the ground.

When the electric motor is activated to control rotation of the rotating shaft, the rotating shaft drives the rotating frame to rotate, and the rotating frame drives the two box-type dissection tables through the box shafts to rotate in a vertical plane with the rotating shaft as a rotation axis. Since the box shafts are provided on the guide rails through the bearings, the box-type dissection tables are always maintained in a horizontal state under the action of gravity during the rotation (that is, both the bottoms of the box-type dissection tables and the experimental subjects are in the horizontal state), and the experimental subjects will not experience inversion during the rotation (deviating from the horizontal state).

Preferably, the box-type dissection tables are rectangular boxes, and one sides of the box-type dissection tables may serve as any side walls of the rectangular boxes. Since the box shafts are matched with the guide rails through the bearings, under the action of gravity, upper bottom faces and lower bottom faces of the rectangular boxes as well as the experimental subjects are always maintained in the horizontal state during the rotation.

In an initial state, the two box-type dissection tables are vertically stacked (that is, the box shafts of the two box-type dissection tables are parallel and are located in the same vertical plane). Upon 180-degree rotation of the rotating shaft, the two box-type dissection tables are exchanged in their vertically stacked positions.

Driving devices with a self-locking function are also mounted on the box shafts, and the driving devices are capable of pushing the box shafts to perform reciprocating motion on the guide rails in a horizontal direction and capable of locking positions of the box shafts on the guide rails; and the controller is connected to and controls the driving devices and the electric motor.

It should be understood that when the box shafts perform horizontal motion in a direction away from the rotating shaft, rotation radii of the two box-type dissection tables are increased, thereby facilitating an operator to stretch out and touch the box-type dissection tables. Conversely, when the box shafts perform horizontal motion in a direction close to the rotating shaft, the rotation radii of the two box-type dissection tables are decreased, thereby facilitating decrease in the heights of the box-type dissection tables when the two box-type dissection tables are vertically stacked and making the dissection tables suitable for operation by a short operator.

Preferably, the rotating shaft is also provided with a self-locking device, which is capable of locking the two box-type dissection tables at any positions on a circumference during the rotation.

In one embodiment of the present disclosure, the driving devices are hydraulic driving devices or electric driving devices. Preferably, the driving devices may be the hydraulic cylinders, which include cylinder sliders, cylinder bodies and cylinder guide rods, the cylinder sliders are mounted on the cylinder guide rods, and the cylinder sliders are connected to and drive the box shafts.

Further, in one embodiment of the present disclosure, the box-type dissection tables include boxes, box covers, pulley blocks, movable trays, fixed trays, sewage outlets and fresh air modules, the pulley blocks include winding pulleys, first fixed pulleys and second fixed pulleys, the winding pulleys are mounted at bottoms of the boxes, the first fixed pulleys and the second fixed pulleys are sequentially mounted on both side walls of the boxes from bottom to top, the winding pulleys are wound with traction ropes, two ends of the traction ropes are respectively toward the two side walls of the boxes and sequentially pass through the first fixed pulleys and the second fixed pulleys, the traction ropes are connected to the movable trays after passing through the second fixed pulleys and hang the movable trays in interiors of the boxes, and ascending and descending of the movable trays in the interiors of the boxes are achieved by releasing or retracting the traction ropes through the winding pulleys.

It should be understood that the winding pulleys refer to fixed pulleys used for winding several turns of the traction ropes. The "first" and the "second" are merely used for distinguishing the two fixed pulleys at different heights on the side walls of the boxes, with no further implications. The two side walls of the boxes refer to two opposite side walls of the boxes. In the present disclosure, the bottoms of the boxes need to face the ground, a direction from the bottoms of the boxes to the ground is "up", and a direction from the ground to the bottoms of the boxes is "down".

The fresh air modules are air outlets with vacuum pumps and are mounted on the side walls of the boxes. The fresh air modules are capable of extracting toxic and harmful gas volatilized from the experimental subjects to achieve a cleanliness rate of up to 95%, thereby avoiding damage of the harmful gas to the operator.

The box covers cover upper openings of the boxes, the box covers are provided with a plurality of spray heads toward the bottoms of the boxes in a direction toward the interiors of the boxes, and the spray heads are capable of spraying a cleaning solvent; the fixed trays are located at height positions between the movable trays and the winding pulleys and are fixed on inner side walls of the boxes, and the sewage outlets are provided on the side walls of the boxes at same height as the fixed trays; and the spray heads are used for spraying the cleaning solvent to clean the interiors of the boxes, and the sprayed cleaning solvent is collected at the bottoms of the boxes and flows out from the sewage outlets.

It should be understood that the movable trays are located above the fixed trays in a vertical direction, and surface areas of the fixed trays need to be larger than surface areas of the movable trays. Preferably, edges of the movable trays are provided with mesh holes, and edges of the fixed trays are connected to the sewage outlets through hoses. Through such arrangement, the cleaning solvent can flow from the edges of the movable trays to the fixed trays and then flow out of the sewage outlets through the hoses.

The boxes are also provided with air cylinders near the box covers, and the air cylinders are capable of controlling opening and closing of the box covers; and the controller is connected to and is capable of controlling the winding pulleys, the fresh air modules and the spray heads.

Preferably, the traction ropes are steel wire ropes; and the second fixed pulleys are mounted at uppermost portions of the side walls of the boxes.

Preferably, the winding pulleys are provided with self-locking devices, which are capable of suspending the trays within a certain height range in the boxes.

Preferably, the controller is a PLC controller; and the controller is also provided with a display screen and control buttons, thereby facilitating intelligent control of the double-layer box-type dissection tables. Preferably, Siemens SR10CPU may be used, with an analog module AM06. Throughout the entire process, the operator only needs to perform human-computer interaction with the display screen and control buttons of the controller, and may also preset a control mode to enable the controller to perform fully automated intelligent control on motion processes of the box-type dissection tables, running processes of the fresh air modules and rinsing and cleaning processes of the spray heads.

In some embodiments, current running positions of the box-type dissection tables may also be preset, stored and recorded through the controller, and the self-locking devices are opened for locking, so that the operator can perform operation at a fixed height throughout the entire process. After the operation is completed, the fresh air modules and the spray heads may also perform intelligent work under mode setting of the controller.

Preferably, the boxes have a height of 350 mm and a width of 800 mm; and the trays are capable of ascending and descending or suspending within a height range of 10 mm-150 mm away from the bottoms of the boxes.

BENEFICIAL EFFECTS OF THE PRESENT DISCLOSURE

The present disclosure is provided with the double-layer box-type dissection tables capable of rotating and moving horizontally, so that the switching of the two experimental subjects can be intelligently controlled by the PLC controller. Moreover, a limitation of the height of the operator is solved, the manual operation cost is reduced, and the efficiency is further improved.

In the present disclosure, the dissection tables are provided as independent box-type structures and are internally provided with the pulley blocks and the fresh air modules, so that not only can the heights of the trays be adjusted for further adapting to the operator to facilitate dissection, but also the harmful gas can be actively discharged from the interiors of the boxes to reduce potential safety hazards.

In the present disclosure, the plurality of spray heads are provided, which can timely clean the interiors of the boxes during operation to prevent secondary pollution.

In the present disclosure, the air cylinders capable of controlling opening and closing of the box covers are provided, which can protect the experimental subjects from contamination.

The present disclosure achieves integrated control, convenient operation and high practicability.

In the figures, 1: control module, 2: power module, 3: box-type dissection table;

1-1: display screen, 1-2: control button, 1-3: electric motor, 1-4: controller, 1-5: driving device, 2-1: hydraulic cylinder, 2-1-1: cylinder slider, 2-1-2: cylinder guide rod, 2-2: rotating shaft, 2-3: cross rod, 2-4: rotating frame, 2-4-1: guide rail, 3-1: box shaft, 3-2: box, 3-3: box cover, 3-4: air cylinder, 3-5: first fixed pulley, 3-6: second fixed pulley, 3-7: winding pulley, 3-8: movable tray, 3-9: fixed tray, 3-10: sewage outlet, 3-11: fresh air module, 3-12: traction rope, 3-13: spray head.

DETAILED DESCRIPTION

Example 1

Figure 1:
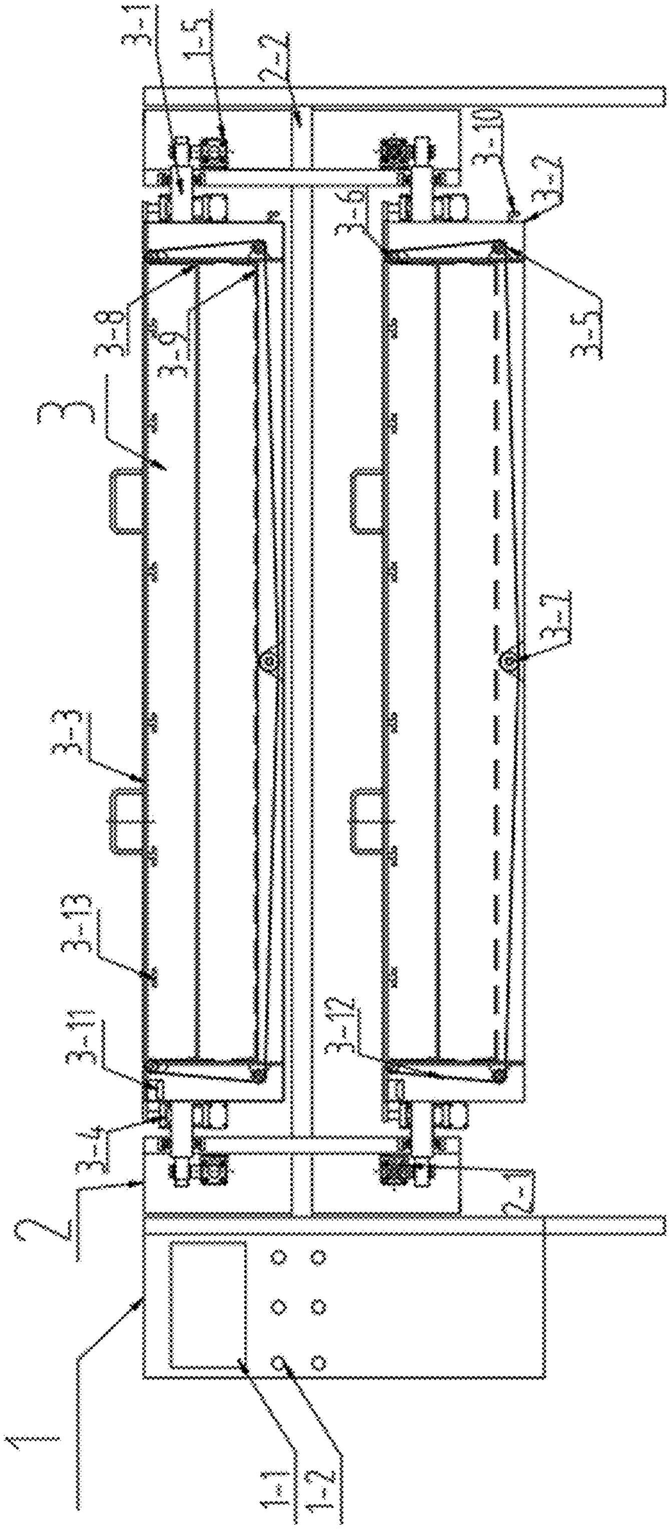
FIG. 1 is a front view of an overall structure in one embodiment of the present disclosure.
Figure 2:
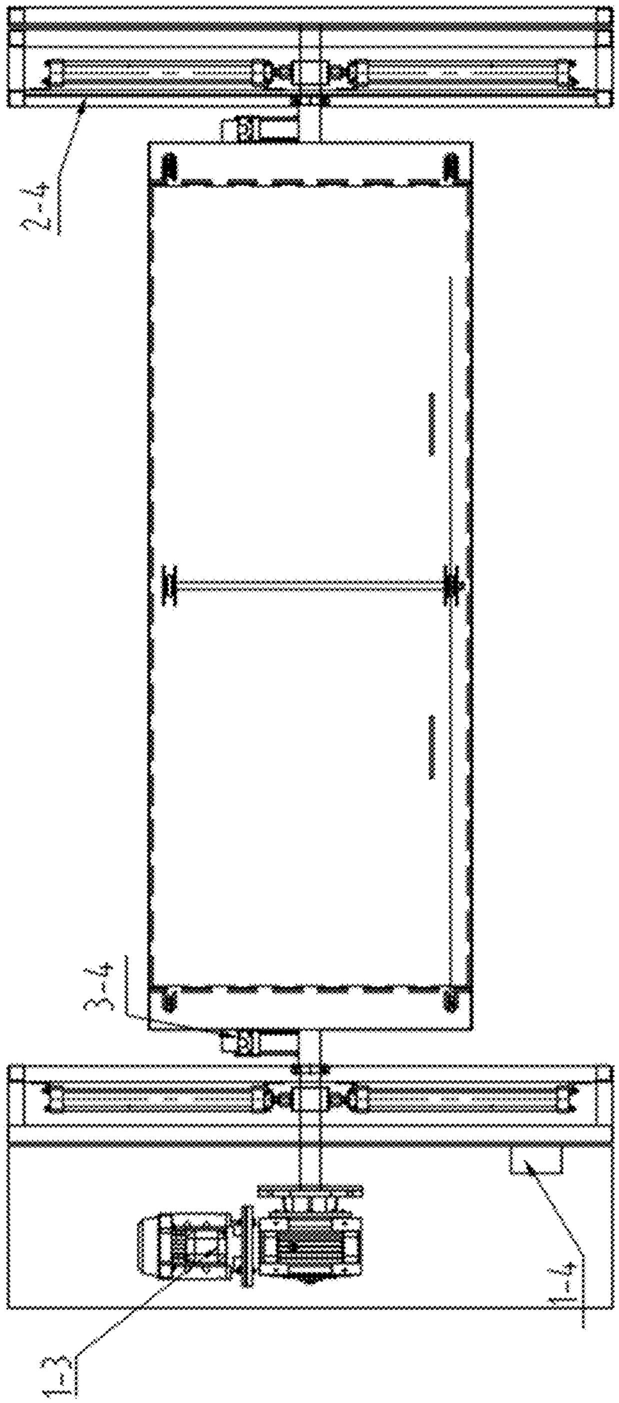
FIG. 2 is a cross-sectional view of an overall structure in one embodiment of the present disclosure.
Figure 3:
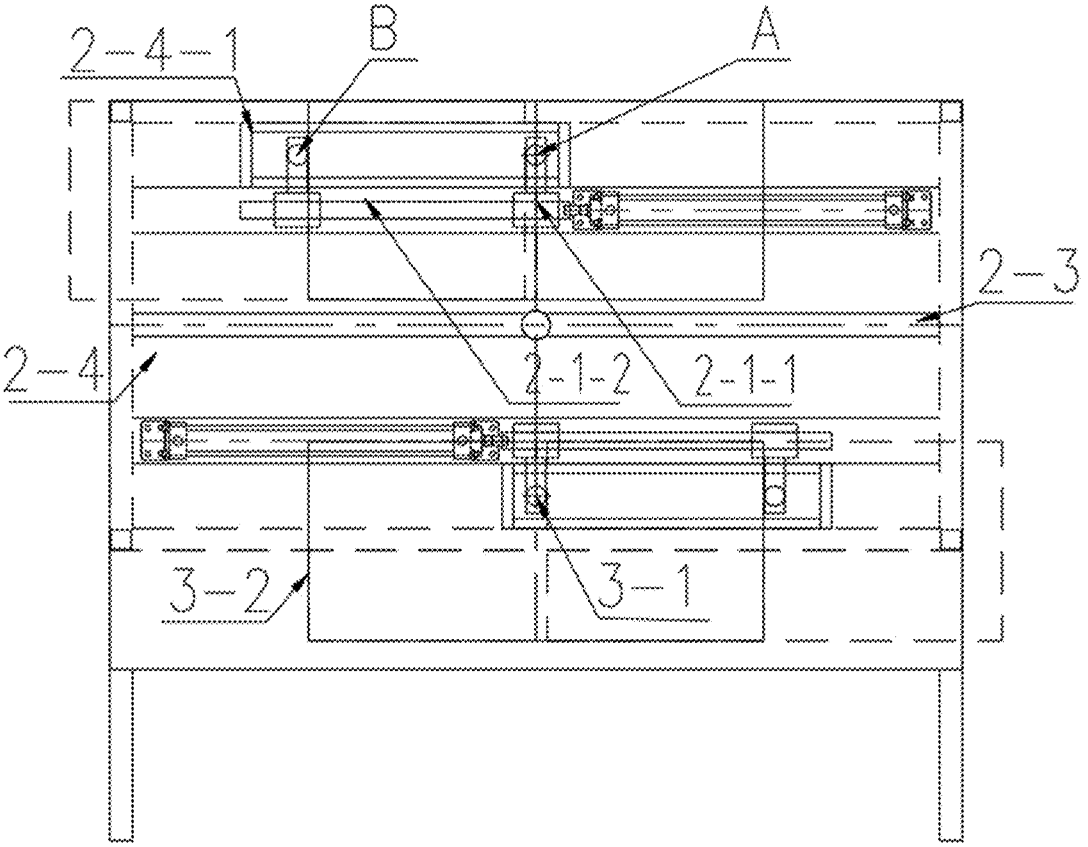
FIG. 3 is a side view of a hydraulic cylinder portion in one embodiment of the present disclosure.

As shown in FIG. 1 to FIG. 3, the present disclosure provides an intelligent surgical dissection table capable of exchanging positions, which includes a control module 1, a power module 2 and two box-type dissection tables 3. The control module 1 includes a controller 1-4 and an electric motor 1-3. The power module 2 includes a rotating shaft 2-2, a rotating frame 2-4 and hydraulic cylinders 2-1. Two sides of each of the box-type dissection tables 3 are both connected with box shafts 3-1.

The electric motor 1-3 is connected to and controls the rotating shaft 2-2, the rotating shaft 2-2 is connected to the rotating frame 2-4 through cross rods 2-3, the rotating frame 2-4 is square and is provided with guide rails 2-4-1, and the box shafts 3-1 are matched with the guide rails 2-4-1 through bearings.

When the electric motor 1-3 is activated to control rotation of the rotating shaft 2-2, the rotating shaft 2-2 drives the rotating frame 2-4 to rotate, and the rotating frame 2-4 drives the two box-type dissection tables 3 through the box shafts 3-1 to rotate in a vertical plane with the rotating shaft 2-2 as a rotation axis. Since the box shafts 3-1 are provided on the guide rails 2-4-1 through the bearings, the box-type dissection tables 3 are always maintained in a horizontal state under the action of gravity during the rotation (that is, both bottoms of the box-type dissection tables 3 and experimental subjects are in the horizontal state), and the experimental subjects will not experience inversion during the rotation (deviating from the horizontal state).

In an initial state, the two box-type dissection tables 3 are vertically stacked. Upon 180-degree rotation, the two box-type dissection tables are exchanged in their vertically stacked positions.

Driving devices 1-5 with a self-locking function are also mounted on the box shafts 3-1. The driving devices 1-5 are the hydraulic cylinders 2-1, which include cylinder sliders 2-1-1, cylinder body 2-1-3 and cylinder guide rods 2-1-2. The cylinder sliders 2-1-1 are mounted on the cylinder guide rods 2-1-2. The cylinder sliders 2-1-1 are connected to and drive the box shafts 3-1 to perform reciprocating motion on the guide rails 2-4-1 in a horizontal direction and are capable of locking positions of the box shafts 3-1 on the guide rails 2-4-1. As shown in FIG. 3, positions A are initial positions of boxes 3-2, and positions B are positions of the boxes 3-2 after movement. The controller 1-4 is connected to and controls the hydraulic cylinders 2-1 and the electric motor 1-3.

The rotating shaft 2-2 is also provided with a self-locking device, which is capable of locking the two box-type dissection tables 3 at any positions on a circumference during the rotation.

Figure 4:
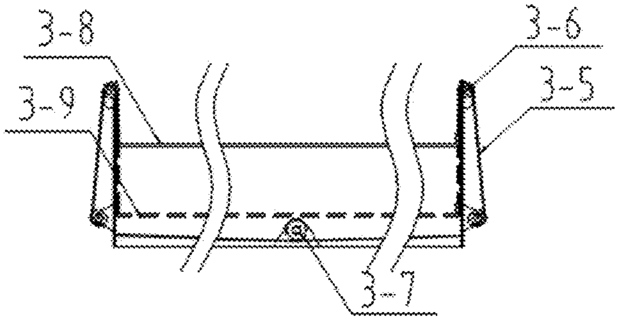
FIG. 4 is a sectional view of a box-type dissection table in one embodiment of the present disclosure.

As shown in FIG. 4, the box-type dissection tables 3 include the boxes 3-2, box covers 3-3, pulley blocks, movable trays 3-8, fixed trays 3-9, sewage outlets 3-10 and fresh air modules 3-11. The pulley blocks include winding pulleys 3-7, first fixed pulleys 3-5 and second fixed pulleys 3-6. The winding pulleys 3-7 are mounted at bottoms of the boxes 3-2. The first fixed pulleys 3-5 and the second fixed pulleys 3-6 are sequentially mounted on both side walls of the boxes 3-2 from bottom to top. The winding pulleys 3-7 are wound with traction ropes 3-12. Two ends of the traction ropes 3-12 are respectively toward the two side walls of the boxes 3-2 and sequentially pass through the first fixed pulleys 3-5 and the second fixed pulleys 3-6. The traction ropes 3-12 are connected to the movable trays 3-8 after passing through the second fixed pulleys 3-6 and hang the movable trays 3-8 in interiors of the boxes 3-2. Ascending and descending or suspending of the movable trays 3-8 in the interiors of the boxes are achieved by releasing or retracting the traction ropes through the winding pulleys 3-7.

The fresh air modules 3-11 are air outlets with vacuum pumps and are mounted on the side walls of the boxes 3-2. The fresh air modules 3-11 are capable of extracting toxic and harmful gas volatilized from the experimental subjects to achieve a cleanliness rate of up to 95%, thereby avoiding damage of the harmful gas to an operator.

The box covers 3-3 cover upper openings of the boxes 3-2. The box covers 3-3 are provided with a plurality of spray heads 3-13 toward the bottoms of the boxes 3-2 in a direction toward the interiors of the boxes 3-2. The spray heads 3-13 are capable of spraying a cleaning solvent. The fixed trays 3-9 are located at height positions between the movable trays 3-8 and the winding pulleys 3-7 and are fixed on inner side walls of the boxes 3-2. The sewage outlets 3-10 are provided on the side walls of the boxes 3-2 at same height as the fixed trays 3-9. The spray heads 3-13 are used for spraying the cleaning solvent to clean the interiors of the boxes 3-2. The sprayed cleaning solvent is collected at the bottoms of the boxes 3-2 and flows out from the sewage outlets 3-10.

Edges of the movable trays 3-8 are provided with mesh holes, and edges of the fixed trays 3-9 are connected to the sewage outlets 3-10 through hoses. Through such arrangement, the cleaning solvent can flow from the edges of the movable trays 3-8 to the fixed trays 3-9 and then flow out of the sewage outlets 3-10 through the hoses.

The boxes 3-2 are also provided with air cylinders 3-4 near the box covers 3-3. The air cylinders 3-4 are capable of controlling opening and closing of the box covers 3-3. The controller 1-4 is connected to and is capable of controlling the winding pulleys 3-7, the fresh air modules 3-11, the spray heads 3-13 and the air cylinders 3-4.

The traction ropes 3-12 are steel wire ropes. The second fixed pulleys 3-6 are mounted at uppermost portions of the side walls of the boxes 3-2.

The winding pulleys 3-7 are provided with self-locking devices, which are capable of suspending the trays within a certain height range in the boxes.

Preferably, the controller 1-4 is a PLC controller. The controller 1-4 is also provided with a display screen 1-1 and control buttons 1-2.

The boxes 3-2 have a height of 350 mm and a width of 800 mm. A distance between the two boxes 3-2 is 250 mm. The trays are capable of ascending and descending or suspending within a height range of 10 mm-150 mm away from the bottoms of the boxes.

Example 2

When an operator is tall and can operate the upper box-type dissection table 3 in the initial state, the surgical dissection table is first adjusted to the initial state through the controller 1-4. That is, the two box-type dissection tables 3 are vertically stacked, with the upper box-type dissection table 3 and the lower box-type dissection table 3 designated as X and Y respectively. Dissection of the first experimental subject on the upper box-type dissection table 3 is as follows: the box covers 3-3 are opened through the air cylinders 3-4, the experimental subjects are placed on the movable trays 3-8, then the pulley blocks are controlled through the controller 1-4 to enable the movable trays 3-8 to be adjusted to heights suitable for the operator, and then the dissection of the first experimental subject is performed.

After the dissection of the first experimental subject is completed, the fresh air modules 3-10 can be opened to extract harmful gas and formalin in the interiors of the boxes 3-2, and meanwhile, the spray heads 3-13 can be opened to clean the interiors of the boxes 3-2.

Figure 5:
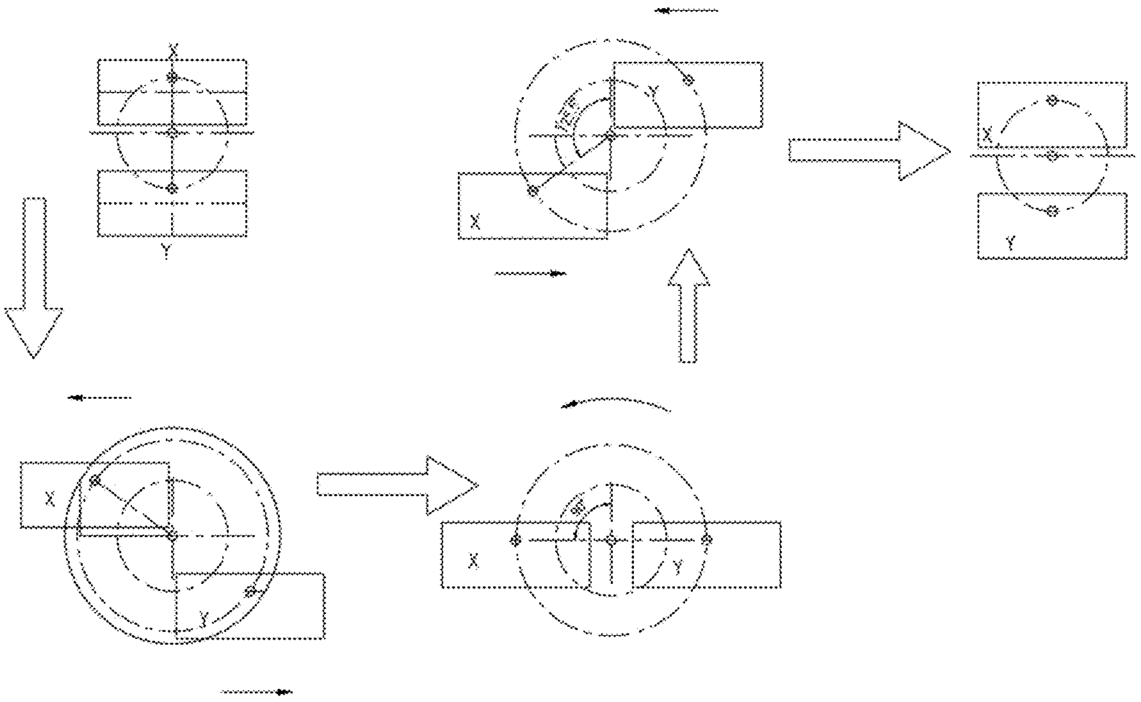
FIG. 5 is a motion trajectory diagram of a box-type dissection table in one embodiment of the present disclosure.

As shown in FIG. 5, when the second experimental subject needs to be dissected continuously, the first experimental subject is not required to be transferred from the upper box-type dissection table 3, only the air cylinders 3-4 need to be controlled to close the box cover 3-3 of the upper box-type dissection table 3, and then the hydraulic cylinders 2-1 are controlled to push the box shafts 3-1 and the box-type dissection tables 3 to move horizontally in a direction away from the rotating shaft 2-2 and to be self-locked, thereby increasing rotation radii of the box-type dissection tables 3. Then, the electric motor 1-3 is activated to enable the rotating shaft 2-2 to rotate counterclockwise. During the rotation, the two box-type dissection tables 3 are always maintained horizontal.

Upon 180-degree rotation, the electric motor 1-3 is deactivated, and the hydraulic cylinders 2-1 are controlled to push the box shafts 3-1 and the box-type dissection tables 3 to move horizontally in a direction close to the rotating shaft 2-2 to vertically stacked positions in a same vertical plane and to be self-locked, thereby achieving vertical exchange of the two boxes. Throughout the entire process, the box-type dissection tables 3 are always maintained horizontal, and the experimental subjects will not experience inversion.

Throughout the entire process, the operator only needs to perform human-computer interaction with the display screen and control buttons of the controller 1-4, and may also preset a control mode to enable the controller 1-4 to perform fully automated intelligent control on motion processes of the box-type dissection tables 3, running processes of the fresh air modules 3-10 and rinsing and cleaning processes of the spray heads 3-13.

In some embodiments, current running positions of the box-type dissection tables may also be preset, stored and recorded through the controller 1-4, and the self-locking devices are opened for locking, so that the operator can perform operation at a fixed height throughout the entire process. After the operation is completed, the fresh air modules 3-10 and the spray heads 3-13 may also perform intelligent work under mode setting of the controller 1-4.

Example 3

When an operator is short and cannot operate the upper box-type dissection table 3 in the initial state, the surgical dissection table can be adjusted to the initial state through the controller 1-4. That is, the two box-type dissection tables 3 are vertically stacked. The first experimental subject on the lower box-type dissection table 3 is dissected, followed by execution of the operation in Embodiment 2 to switch to the second experimental subject.

The box-type dissection tables 3 may also be adjusted to height positions that can be operated by the operator himself/herself through the controller 1-4 for operation. For example, u upon rotation of 125.5 degrees from the initial state, the rotating shaft 2-2 is stopped from rotation and is self-locked, followed by execution of the operation in Example 2 to switch to the second experimental subject.

It should be understood that a user can adjust the rotation angle of the rotating shaft 2-2 and the heights of the movable trays 3-8 according to own situations.

What is claimed is:

1. An intelligent surgical dissection table capable of exchanging positions, comprising a control module (1), a power module (2) and two box-type dissection tables (3), wherein the control module comprises a controller (1-4) and an electric motor (1-3), the power module (2) comprises a rotating shaft (2-2), a rotating frame (2-4) and hydraulic cylinders (2-1), and two sides of each of the box-type dissection tables (3) are both connected with box shafts (3-1); the electric motor (1-3) is connected to and controls the rotating shaft (2-2), the rotating shaft (2-2) is connected to the rotating frame (2-4) through cross rods (2-3), the rotating frame (2-4) is square and is provided with guide rails (2-4-1), box shafts (3-1) are matched with the guide rails (2-4-1) through bearings, driving devices (1-5) with a self-locking function are also mounted on the box shafts (3-1), and the driving devices (1-5) are capable of pushing the box shafts (3-1) to perform reciprocating motion on the hole in a horizontal direction and capable of locking positions of the box shafts (3-1) on the hole; and the controller (1-4) is connected to and controls the driving devices (1-5) and the electric motor (1-3).

2. The intelligent surgical dissection table capable of exchanging positions according to claim 1, wherein the driving devices (1-5) are hydraulic driving devices or electric driving devices.

3. The intelligent surgical dissection table capable of exchanging positions according to claim 2, wherein the driving devices (1-5) are the hydraulic cylinders (2-1) and comprise cylinder sliders (2-1-1), cylinder bodies (2-1-3) and cylinder guide rods (2-1-2), the cylinder sliders (2-1-1) are mounted on the cylinder guide rods (2-1-2), and the cylinder sliders (2-1-1) are connected to and drive the box shafts (3-1) to perform reciprocating motion on the guide rails (2-4-1) in a horizontal direction and are capable of locking positions of the box shafts (3-1) on the guide rails (2-4-1).

4. The intelligent surgical dissection table capable of exchanging positions according to claim 1, wherein the box-type dissection tables (3) comprise boxes (3-2), box covers (3-3), pulley blocks, movable trays (3-8), fixed trays (3-9), sewage outlets (3-10) and fresh air modules (3-11), the pulley blocks comprise winding pulleys (3-7), first fixed pulleys (3-5) and second fixed pulleys (3-6), the winding pulleys (3-7) are mounted at bottoms of the boxes (3-2), the first fixed pulleys (3-5) and the second fixed pulleys (3-6) are sequentially mounted on both side walls of the boxes (3-2) from bottom to top, the winding pulleys (3-7) are wound with traction ropes (3-12), two ends of the traction ropes (3-12) are respectively toward the two side walls of the boxes (3-2) and sequentially pass through the first fixed pulleys (3-5) and the second fixed pulleys (3-6), the traction ropes (3-12) are connected to the movable trays (3-8) after passing through the second fixed pulleys (3-6) and hang the movable trays (3-8) in interiors of the boxes (3-2), and ascending and descending of the movable trays (3-8) in the interiors of the boxes are achieved by releasing or retracting the traction ropes through the winding pulleys (3-7); the fresh air modules (3-11) are air outlets with vacuum pumps and are mounted on the side walls of the boxes (3-2);

the box covers (3-3) cover upper openings of the boxes (3-2), the box covers (3-3) are provided with a plurality of spray heads (3-13) toward the bottoms of the boxes (3-2) in a direction toward the interiors of the boxes (3-2), and the spray heads (3-13) are capable of spraying a cleaning solvent; the fixed trays (3-9) are located at height positions between the movable trays (3-8) and the winding pulleys (3-7) and are fixed on inner side walls of the boxes (3-2), and the sewage outlets (3-10) are provided on the side walls of the boxes (3-2) at the same elevation as the fixed trays (3-9);

the boxes (3-2) are also provided with air cylinders (3-4) near the box covers (3-3), and the air cylinders (3-4) are capable of controlling opening and closing of the box covers (3-3); and the controller (1-4) is connected to and is capable of controlling the winding pulleys (3-7), the fresh air modules (3-11), the spray heads (3-13) and the air cylinders (3-4).

5. The intelligent surgical dissection table capable of exchanging positions according to claim 4, wherein the traction ropes (3-12) are steel wire ropes.

6. The intelligent surgical dissection table capable of exchanging positions according to claim 4, wherein both the rotating shaft (3-1) and the winding pulleys (3-7) are provided with self-locking devices.

7. The intelligent surgical dissection table capable of exchanging positions according to claim 6, wherein the boxes (3-2) have a height of 350 mm and a width of 800 mm; and the trays are capable of ascending and descending or suspending within a height range of 10 mm-150 mm away from the bottoms of the boxes.

8. The intelligent surgical dissection table capable of exchanging positions according to claim 1, wherein the controller (1-4) is a PLC controller.

9. The intelligent surgical dissection table capable of exchanging positions according to claim 8, wherein the controller is also provided with a display screen (1-1) and control buttons (1-2).

* * * * *